(12) United States Patent
Wilgosz

(10) Patent No.: US 9,346,505 B1
(45) Date of Patent: May 24, 2016

(54) CONVERTIBLE BICYCLE SEAT

(71) Applicant: Robert Wilgosz, Mantua, NJ (US)

(72) Inventor: Robert Wilgosz, Mantua, NJ (US)

( * ) Notice: Subject to any disclaimer, the term of this patent is extended or adjusted under 35 U.S.C. 154(b) by 0 days.

(21) Appl. No.: 14/627,037

(22) Filed: Feb. 20, 2015

(51) Int. Cl.
*B62J 1/28* (2006.01)
*A47C 13/00* (2006.01)
*A47C 9/10* (2006.01)

(52) U.S. Cl.
CPC . *B62J 1/28* (2013.01); *A47C 9/105* (2013.01); *A47C 13/00* (2013.01)

(58) Field of Classification Search
CPC ........................................ A47C 9/105
USPC ........................................ 297/130
See application file for complete search history.

(56) References Cited

U.S. PATENT DOCUMENTS

| | | | | |
|---|---|---|---|---|
| 542,609 A * | 7/1895 | Gordon et al. | ........... | A45B 5/00 135/66 |
| 1,588,575 A * | 6/1926 | Grunwald | ............. | A47C 9/105 248/435 |
| 1,601,206 A * | 9/1926 | Franz | ..................... | A47C 9/105 108/166 |
| 2,560,447 A * | 7/1951 | Jansen | ..................... | A45B 5/00 248/155.1 |
| 3,038,690 A * | 6/1962 | Alexiou | ................... | A47C 4/24 108/128 |
| 3,497,293 A * | 2/1970 | Davis | ...................... | A45B 5/00 359/862 |
| 6,192,908 B1 * | 2/2001 | Smith | ...................... | A45B 5/00 135/65 |
| 2003/0020312 A1 * | 1/2003 | Wang | ....................... | A47C 3/34 297/344.18 |
| 2014/0021752 A1 * | 1/2014 | von Letkemann | ..... | A47C 7/022 297/195.11 |
| 2015/0075576 A1 * | 3/2015 | Gullo | .................... | A47C 9/105 135/66 |

* cited by examiner

*Primary Examiner* — Timothy J Brindley
(74) *Attorney, Agent, or Firm* — Stuart M. Goldstein

(57) ABSTRACT

A convertible bicycle seat has a saddle, a saddle stem with an upper end and a lower end, the saddle being connected at the upper end of the saddle stem. A plurality of legs are attached at the lower end of the saddle stem and are pivotable between a first position in which the legs are located and aligned with the saddle stem, to a second position in which the legs extend outward from the saddle stem to support the saddle as a separate and independent stool-like seat.

2 Claims, 5 Drawing Sheets

CONVERTIBLE BICYCLE SEAT

BACKGROUND OF THE INVENTION

Upon reaching their destinations and parking their bikes, bicyclists often want a practical and comfortable place to sit, apart from the bicycle. If there are no chairs available, the rider will usually be forced to sit on the ground, a nearby tree trunk, or similar uncomfortable spot. Strapping a chair to a bicycle or carrying a chair on one's back while riding a bike is not a practical or safe solution. And again the alternative is to go without a comfortable place to sit when one dismounts from the bicycle.

SUMMARY OF THE INVENTION

It is thus the object of the present invention to provide a convertible bicycle seat which doubles both as a bicycle saddle seat and a seat which can be removed from the bicycle to be used separate and independently from the bicycle as a stool-like seat.

This and other objects are accomplished by the present invention, a convertible bicycle seat which comprises a saddle, a saddle stem with an upper end and a lower end, the saddle being connected at the upper end of the saddle stem. A plurality of legs are attached at the lower end of the saddle stem and are pivotable between a first position in which the legs are located and aligned with the saddle stem, to a second position in which the legs extend outward from the saddle stem to support the saddle as a separate and independent stool-like seat.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
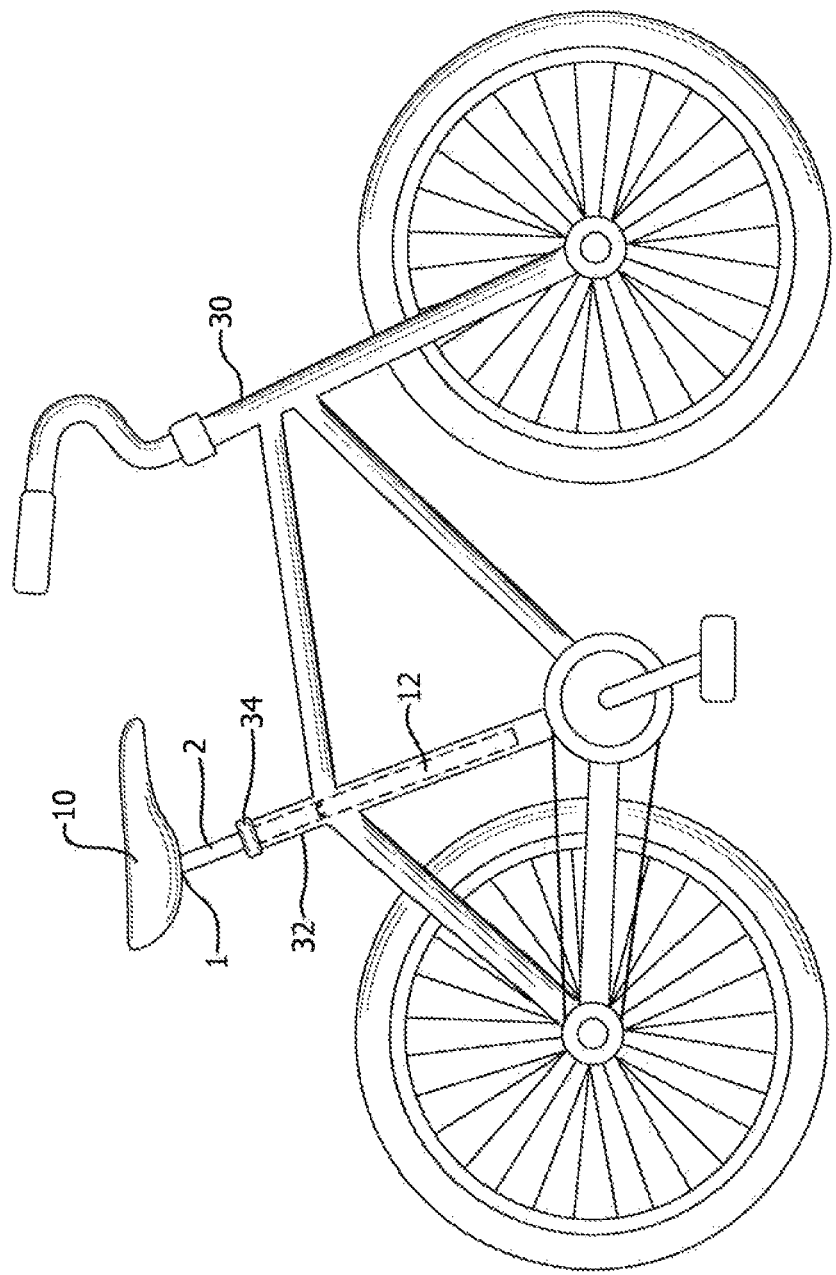
FIG. 1 is an elevation view of a bicycle utilizing the convertible bicycle seat of the present invention.

Convertible bicycle seat 1 comprises saddle stem 2 configured as an elongated tube having exterior surface 4, upper end 6 and lower end 8. Saddle 10 is connected at upper end 6 of the saddle stem in any recognized manner standard in the art. This connection forms no part of the invention.

Figure 2:
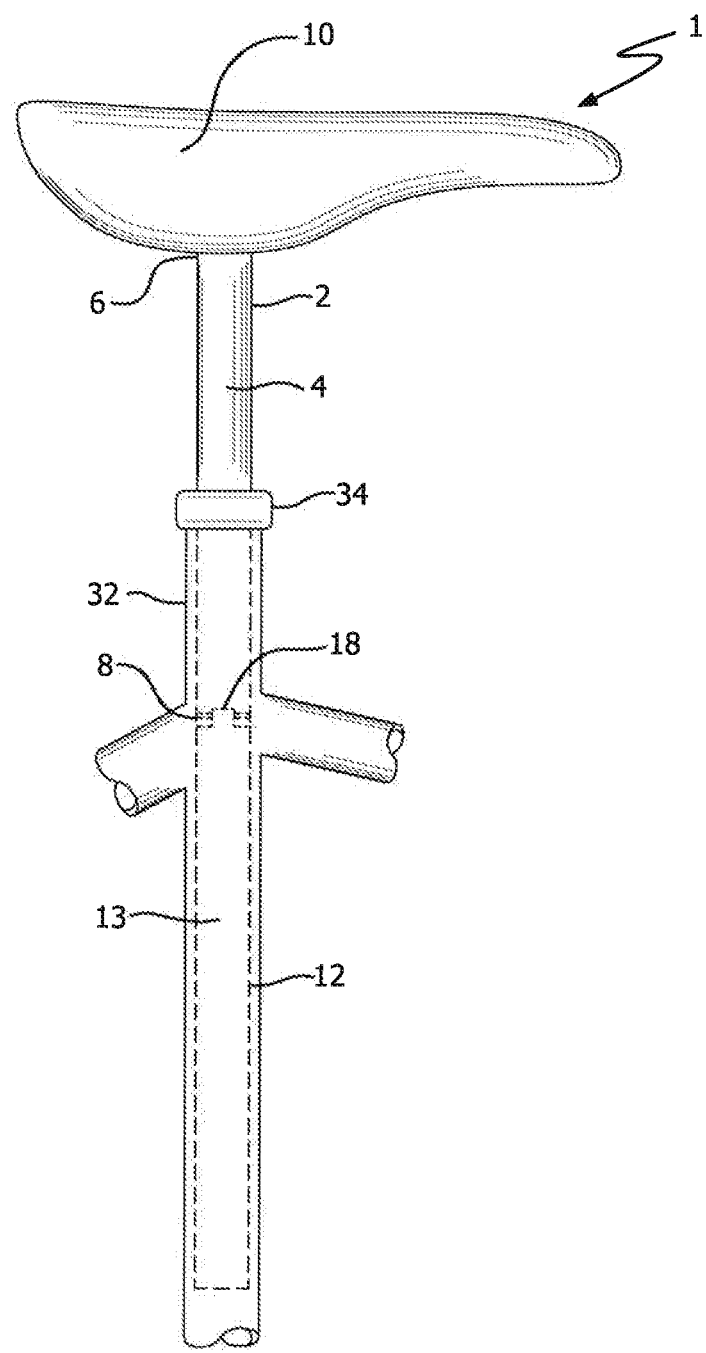
FIG. 2 is a close-up view of the convertible bicycle seat of the present invention inserted into the seat post of a bicycle.
Figure 3:
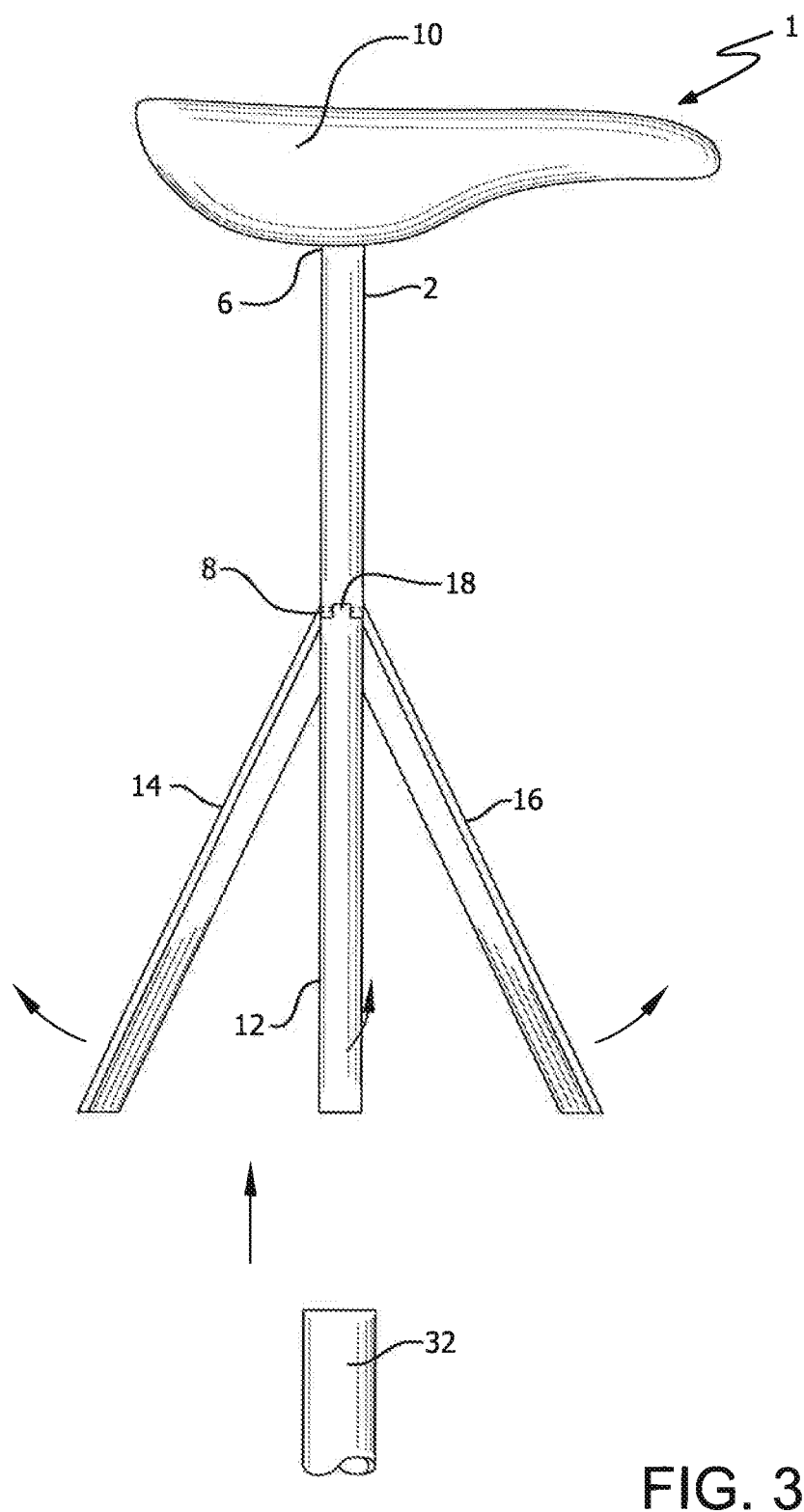
FIG. 3 shows the convertible bicycle seat of the present invention with its support legs extended outward of its saddle stem, in the stool-like seat configuration.
Figure 4:
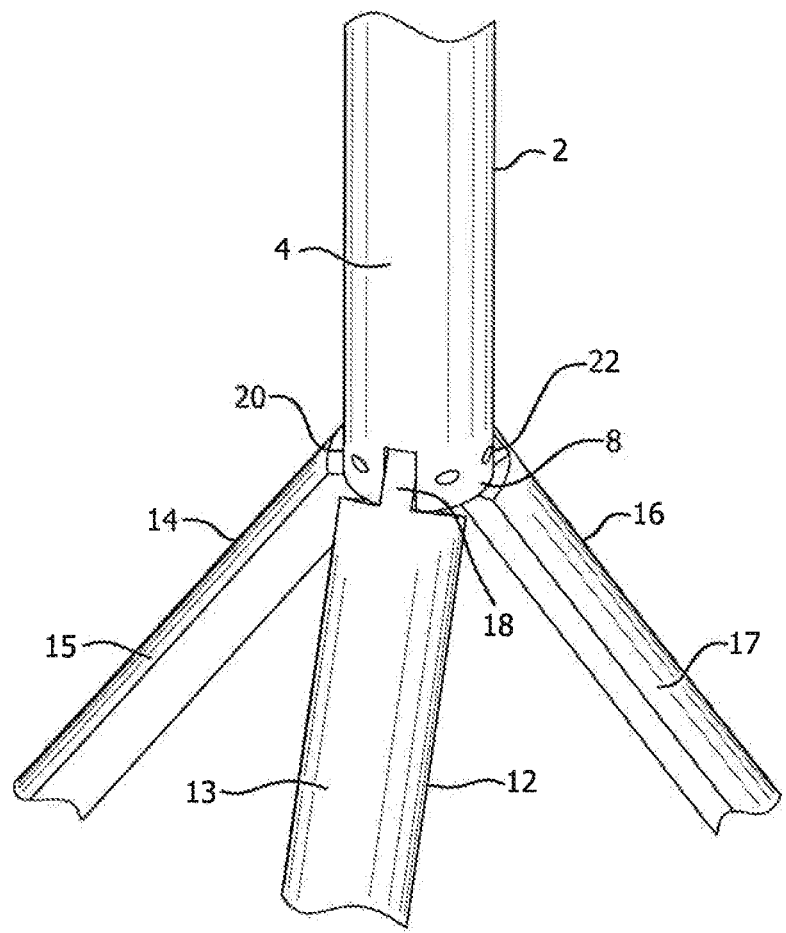
FIG. 4 shows a close-up view of the support legs pivoted out from the saddle stem of the convertible bicycle seat of the present invention.
Figure 5:
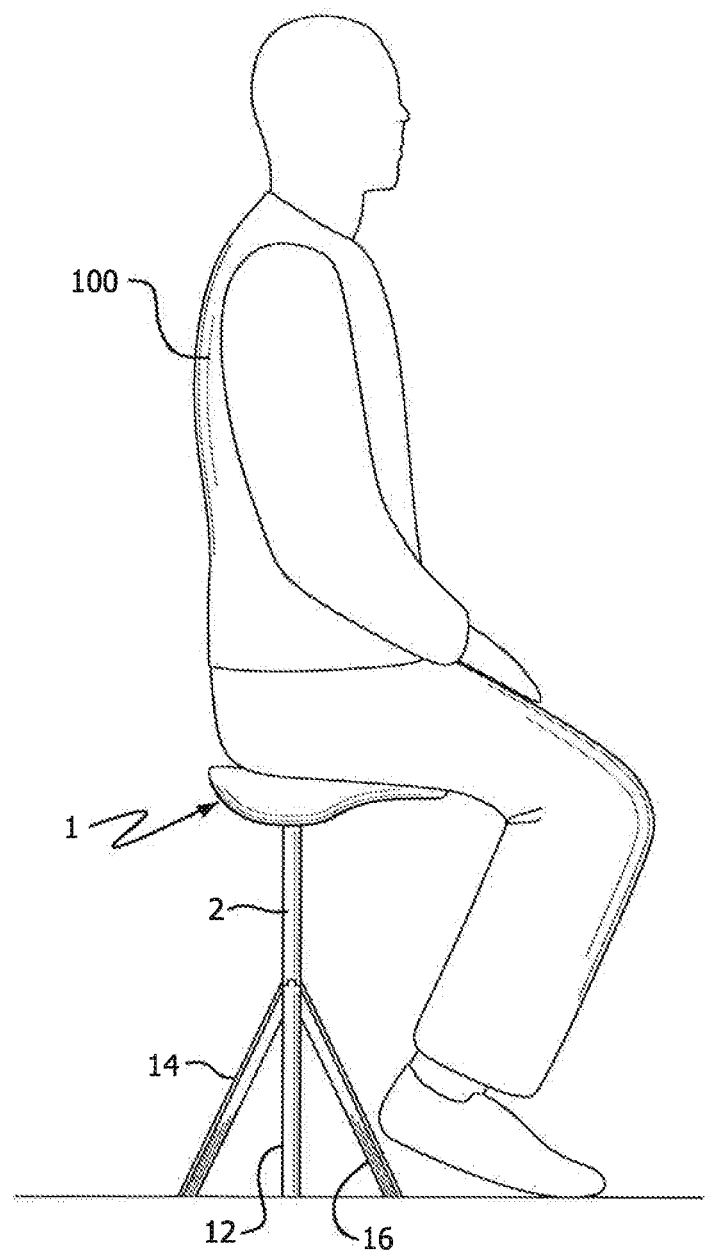
FIG. 5 shows the convertible bicycle seat of the present invention used as a stool-like seat, separate and independently from a bicycle.

Support legs 12, 14, and 16 are connected via pivotable hinge joints 18, 20, and 22 at lower end 8 of saddle stem 2. Support leg 12 has exterior surface 13, support leg 14 has exterior surface 15, and support leg 16 has exterior surface 17. Support legs 12, 14, and 16 are pivotable between a first position, in which leg exterior surfaces 13, 15 and 17 are located directly below and aligned with exterior surface 4 of saddle stem 2, as seen in FIGS. 1 and 2, and a second position in which the support legs are pivotably extended out from the saddle stem, as seen in FIGS. 3-5.

When configured in the first position, saddle stem 2 and legs 12, 14, and 16 fit neatly within seat post 32 of bicycle 30 and the bicycle is operated as normal. See FIGS. 1 and 2. A known seat post clamp 34 is used to secure saddle stem 2 at the desired height in relation to seat post 32.

Convertible bicycle seat 1 is designed to be used separate and independently of bicycle 30. To do so, clamp 34 is loosened to allow bicycle seat 1 to be removed from seat post 32. Once bicycle seat 1 is so removed, support legs 12, 14, and 16 are pivoted out to the second position and placed on the ground. In this position, shown in FIG. 5, bicycle seat 1 is used as a stool-like seat for an individual 100.

When bicycle 30 is again to be ridden, legs 12, 14, and 16 are pivoted back to the first position, so that leg exterior surfaces 13, 15, and 17 are located directly below and aligned with exterior surface 4 of saddle stem 2. The saddle stem can then be inserted into seat post 32 and secured in place by clamp 34. Bicycle 30 is then ready to be used once again.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A convertible bicycle seat for use both within a seat post of a bicycle and separate and independently of the seat post and the bicycle, said bicycle seat comprising:
   a saddle;
   a saddle stem comprising an elongated tube having an exterior surface, an upper end, and a lower end, said saddle being connected directly to the upper end of the elongated tube; and
   a plurality of legs attached at the lower end of the elongated tube, the legs having exterior surfaces and being pivotable between a first position in which the entire exterior surface of each of the legs is located directly below and are aligned with the exterior surface of the elongated tube and the saddle stem and the legs fit within the seat post of the bicycle, and a second position in which the saddle stem is removed from the seat post and the legs extend out from the saddle stem to support the bicycle seat separate and independently of the bicycle; and
   pivotable hinge joints connecting each leg to the elongated tube, the binge joints being the only components connecting the legs to the saddle stem.

2. The convertible bicycle seat as in claim 1 wherein the plurality of legs comprises three legs.

* * * * *